F. GAUTHIER.
RIM TOOL FOR AUTOMOBILES.
APPLICATION FILED JAN. 2, 1920.
1,410,910.  Patented Mar. 28, 1922.
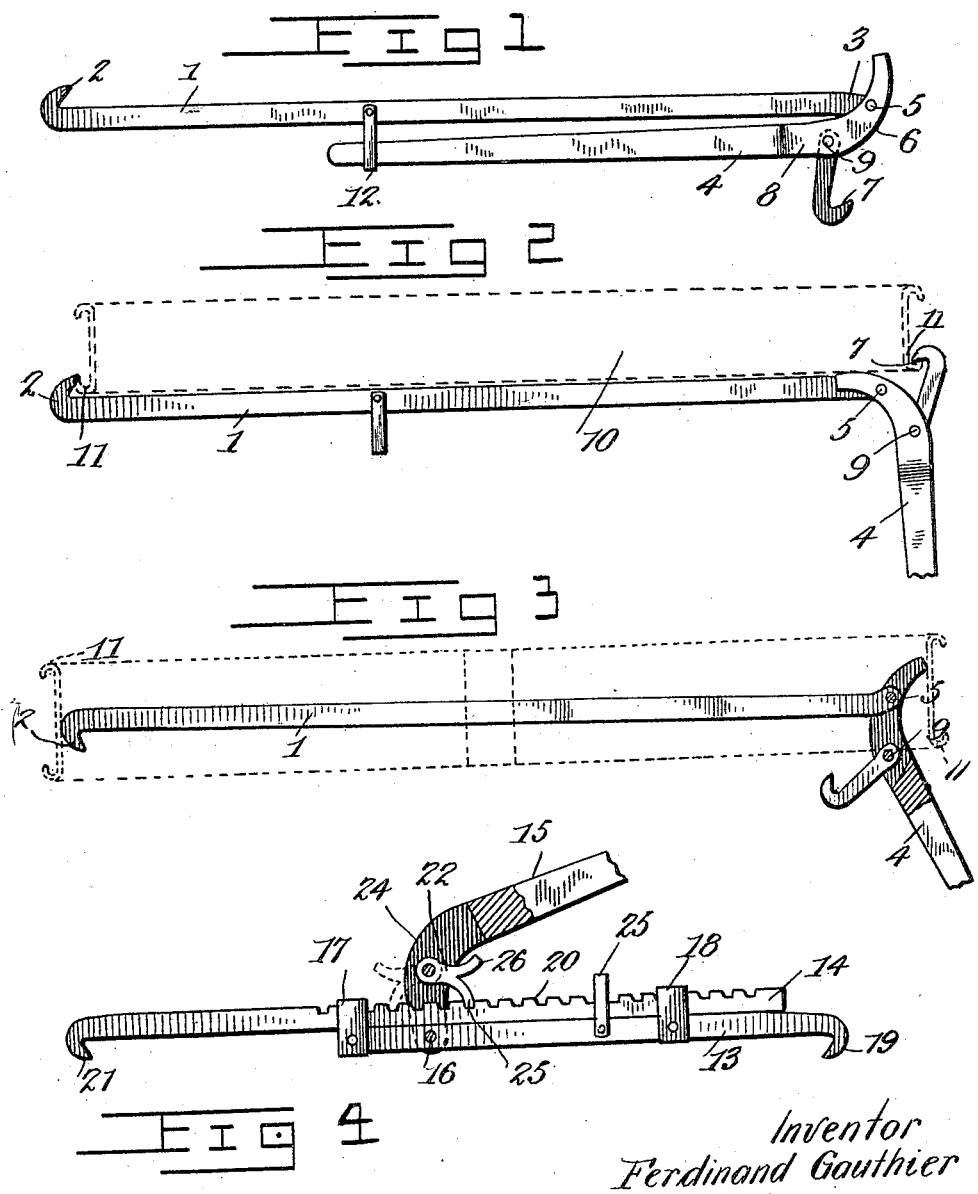
Inventor
Ferdinand Gauthier
By William C. Sinton
Attorney

UNITED STATES PATENT OFFICE.

FERDINAND GAUTHIER, OF MARIEVILLE, QUEBEC, CANADA, ASSIGNOR OF ONE-HALF TO HORMIDAS PICHE, OF MARIEVILLE, CANADA.

RIM TOOL FOR AUTOMOBILES.

1,410,910.  Specification of Letters Patent.  Patented Mar. 28, 1922.

Application filed January 2, 1920. Serial No. 348,892.

*To all whom it may concern:*

Be it known that I, FERDINAND GAUTHIER, a subject of the King of Great Britain, residing at Marieville, Province of Quebec, Canada, have invented certain new and useful Improvements in Rim Tools for Automobiles; and I do hereby declare that the following is a full, clear, and exact description of the invention, such as will enable others skilled in the art to which it appertains to make and use the same.

The present invention relates to a tool for removing rims from automobile tires and the principal object resides in the provision of means for breaking the connection of split rims for removing them from the tire or casing; and for the expansion and resetting of the rims to replace them within the tires.

A further object of the invention is to provide a device that will likewise straighten bent split rims and remove tire shoes from rusted split rims.

With the above and other objects in view which will hereinafter appear as the description continues, the invention consists of the novel features of construction, combination and formation of parts as will be hereinafter more fully described and particularly pointed out in the appended claim.

In the accompanying drawings has been shown a simple and preferred form of the invention, it being, however, understood that no limitation is necessarily made to the precise structural details herein exhibited, but the right is hereby reserved to any changes, alterations or modifications to which recourse may be had that come within the scope of the claims without departing from the spirit of the invention, or sacrificing the efficiency of the same.

In the accompanying drawings:—

Figure 1 is a side elevational view of the tool in inoperative position;

Figure 2 is a similar view with the operative element in position to exert contractive force for removing a rim;

Figure 3 is a side elevational view of the tool in position to exert force to expand the rim to allow for the replacement of same to the tire; and, Figure 4 is an elevational view of a modified form.

Referring now more particularly to the accompanying drawings wherein like and corresponding parts are designated by similar reference characters throughout the several views.

The tool embodying the principle of my improved device comprises the bar member 1, provided with an upwardly directed hook 2 at one end and having its opposite end slightly bent over at 3.

This bar member 1 is pivotally connected to a lever member 4, by means of a bolt 5, which passes through an opening in the bifurcated end 6 of the said lever member 4.

A hook member 7 is likewise mounted in the bifurcated head portion 8 of said lever member 4, on a bolt 9, which passes through openings provided in the bifurcations of the head portion of the lever member 4, and said hook 7 co-operates with the hook 2 of the bar member 1, when the lever 4 is actuated to contract the rim 10, as illustrated in Figure 2.

In this position the hook 2 of the bar member will engage over the flange portion 11 of the rim at one side, while the hook member 7, carried by the lever 4, will engage the opposite flange portion 11 of the rim, and pressure exerted downwardly upon the lever 4 will contract the said rim and draw it from the tire.

Likewise when the rim is to be connected to the tire, the tool is reversed to position the same as illustrated in Figure 3, and when so arranged the end of bar 1 will engage the inner surface of the rim 10, while the end 6 of lever member 4 will engage the inner surface of the rim on the opposite side of the rim. In this position the lever member 4 is pulled downwardly and its end acts as a fulcrum and accordingly the rim is expanded and thus fitted to the tire.

When not in use, the lever member 4, is adjusted upwardly on bolt 5 and will extend relatively parallel with the bar member 1 and the said lever member is held in such position by the connecting link 12 pivotally mounted on the bar member 1.

In the modification illustrated in Figure 4, I provide the bar members 13 and 14, the former being connected to the lever member 15 by means of a pin 16, while the latter is slidably mounted in the straps 17 and 18 of the bar member 13. The bar member 13 is provided at one end with a downwardly directed hook 19, and bar member 14 has its upper edge provided with a rack 20, and one end terminates in a similar downwardly directed hook 21.

A pawl 22 is pivotally mounted on a pin 23 in the bifurcated end 24 of the lever member 18, and has two prongs 25 and 26 adapted for engagement with the rack 20, so that upon the actuation of said lever member 15 the bar 14 may be operated in either direction.

Likewise this modified form of tool may be reversed to contract the rim in the manner illustrated in Figure 2.

Bar members 13 and 14 may be held in locked position by a latch member 25 pivotally mounted on bar member 13, and when adjusted, will engage the teeth of rack 20 and serve to hold the tool in adjusted position.

It is obvious that by the use of my improved tool, tire shoes may be removed from the rims and split rims may be straightened, without the use of hammers.

Having thus fully described my invention, what I claim as new and desire to secure by Letters Patent is:

A tool of the character set forth comprising a bar, having one end bent upwardly for engagement with the rim of a wheel, the opposite end of said bar being slightly curved in the opposite direction, a handle member having one of its ends bifurcated and curved at right angles to the handle portion, said curved end of the bar adapted for pivotal connection intermediate the curved bifurcated portion of the handle member and adjacent the end thereof, a hook having one end pivotally connected in said bifurcated portion adjacent the inner end of the bifurcation, said hook adapted for engagement with the rim of the tire and a link pivotally secured intermediate said bar for holding the handle parallel thereto when the tool is not in use.

In witness whereof I have hereunto set my hand.

FERDINAND GAUTHIER.

Witnesses:
JOSEPH LOUIS GEMME.
REMI PELLETIER.